United States Patent [19]

Schenk

[11] 4,271,508
[45] Jun. 2, 1981

[54] METHOD FOR TRANSMITTING DATA

[75] Inventor: Erwin Schenk, Munich, Fed. Rep. of Germany

[73] Assignee: Siemens Aktiengesellschaft, Berlin & Munich, Fed. Rep. of Germany

[21] Appl. No.: 58,554

[22] Filed: Jul. 18, 1979

[30] Foreign Application Priority Data

Jul. 26, 1978 [DE] Fed. Rep. of Germany ....... 2832855

[51] Int. Cl.³ .............................................. H04J 3/06
[52] U.S. Cl. .................................. 370/106; 370/112; 370/37
[58] Field of Search ................... 370/106, 100, 37, 99, 370/112

[56] References Cited

U.S. PATENT DOCUMENTS

| 3,546,384 | 12/1970 | Brigham | 370/106 |
| 3,995,119 | 11/1976 | Pachynski | 370/100 |
| 3,995,120 | 11/1976 | Pachynski | 370/100 |
| 4,004,100 | 1/1977 | Takimoto | 370/106 |
| 4,095,051 | 6/1978 | Crue | 370/100 |

Primary Examiner—Douglas W. Olms
Attorney, Agent, or Firm—Hill, Van Santen, Steadman, Chiara & Simpson

[57] ABSTRACT

A method is disclosed for transmitting data between two time multiplex systems via a joint or common transmission path. Bit flows output by two time multiplex systems at the transmitter side are chronologically bit-wise interlaced with the aid of a diplexer at the transmitter side and are then reassembled into two bit flows by a diplexer at the receiver side of the time multiplex systems. The bit flows of the first and second time multiplex systems are defined by frames with first and second synchronization words, respectively. At the beginning of transmission, the two receiver side systems are adjusted to the first synchronizaton word. After recognizing the first synchronization word in one of the receiver sides the correct assignment is produced for the bit flows to the two multiplex systems.

4 Claims, 6 Drawing Figures

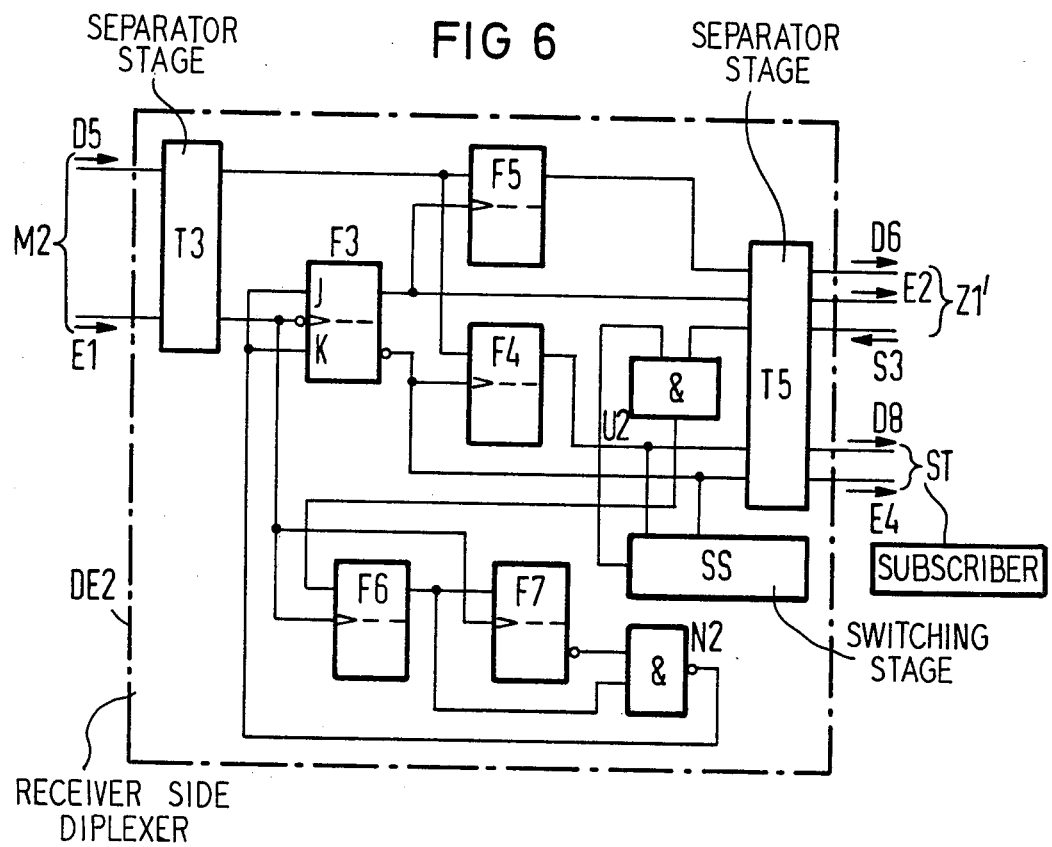

METHOD FOR TRANSMITTING DATA

BACKGROUND OF THE INVENTION

The invention relates to a method and circuit arrangement for transmitting data between two time multiplex systems via a common transmission path. Each time multiplex system produces frames which are respectively formed from a prescribed number of binary characters. These frames contain the data and one synchronization word.

In the last few years, time multiplex systems have greatly gained in importance vis-a-vis frequency multiplex systems used until now. Time multiplex systems assign an available bit flow in chronological sequence in a periodically repeating manner to a multiplicity of data channels, respectively. The period of this process is characterized as a frame. Each frame contains a prescribed number of binary characters representing a synchronization word in addition to the data, with the aid of which the data are assigned to the data channels of the time multiplex system.

The bit flow has a prescribed transmission rate or signalling speed of, for example, 2400 bits/sec. If transmission paths are available which permit a greater transmission rate of e.g. 4800 bits/sec., it is desirable to transmit the bit flows of several time multiplex systems via this transmission path. In such a data transmission, the respective binary characters or frames are transmitted via the transmission path in chronological sequence. The binary characters or frames must again be assigned to the respective time multiplex systems at the receiver side.

It would also be possible to provide transmission units, e.g. modems (modulator-demodulators), arranged between the time multiplex systems and the transmission path with one channel divider, respectively, which connects through the binary characters or frames of the first or of the second time multiplex system to the transmission path according to a time multiplex system in chronological sequence or again divides to the respective time multiplex systems at the receiver side. In such a method an assignment can be produced such that additional synchronization words can be transmitted at the beginning of the transmission, for example. With these synchronization words, the assignment of the data subsequently transmitted relative to the time multiplex systems can be determined. However, such a method has the disadvantage that no continuous monitoring of the assignment takes place. Thus, in case of a malfunction it would be possible that the receiver sides of the time multiplex systems respectively receive the data which are assigned to the other time multiplex system, respectively.

SUMMARY OF THE INVENTION

It is an object of the invention to disclose a method for transmitting data between two time multiplex systems via a joint or common transmission path in which a correct assignment relative to the time multiplex systems is being monitored during the entire time of data transmission.

In a method of the invention, the frames which are provided from the transmitter side of the first or of the second time multiplex system are provided with a first or a second synchronization word. The receiver sides of the time multiplex systems are adjusted to the first synchronization word at the beginning of the transmission and the receiver side of the second time multiplex system is adjusted to the second synchronization word after the first synchronization word is recognized in the receiver side of one of the time multiplex systems. The correct assignment of the binary characters received is produced relative to the time multiplex systems.

The method according to the present invention has the advantage that the correct assignment of the data relative to the time multiplex systems is safeguarded to a large extent due to the continuous monitoring of the synchronization words during the entire data transmission. If the correct assignment is no longer present in one of the time multiplex systems during the transmission of data due to a malfunction, the assignment of the data relative to the different time multiplex system is not influenced thereby.

The synchronization of the receiver sides of the time multiplex systems advantageously proceeds—after the first synchronization word is recognized in the receiver side of the first time multiplex system—by the receiver side of the second time multiplex system being adjusted to the second synchronization word. Or, if the first synchronization word is recognized in the receiver side of the second time multiplex system—the assignment of the received binary characters relative to the receiver sides of the time multiplex systems is exchanged and the receiver side of the second time multiplex system is adjusted to the second synchronization word.

Previously available time multiplex systems can in part be employed without alteration and in part with slight alterations when the synchronization word which is normally provided for the transmission of data in time multiplex systems is utilized as the first synchronization word and when the second synchronization word differs therefrom only by an altered binary character. In accordance with a CCITT recommendation R. 101, Version B, it is thereby advantageous when the first synchronization word contains binary characters 100010 and when the second synchronization word contains binary characters 110010.

A circuit arrangement for carrying out the method results in low cost when a diplexer at the transmitter side is connected at the outlet side of the transmitter sides of the time multiplex systems. This diplexer alternately connects through binary characters of the first or of the second time multiplex system to the transmission path via a transmission unit at the transmitter side. If a diplexer at the receiver side is connected at the outlet side of a transmission unit of the receiver side, this diplexer alternately assigns the binary characters to the receiver sides of the time multiplex systems and which produces the correct assignment of the frames relative to the time multiplex systems after recognizing the first synchronization word in the receiver side of a time multiplex system.

For the synchronization of the receiver sides of the time multiplex systems it is expedient when the diplexer at the receiver side outputs a signal after recognition of the first synchronization word in the receiver side of one of the time multiplex systems. This signal adjusts the receiver side of the second time multiplex system to the second synchronization word.

The correct assignment of the frames relative to the receiver sides of the time multiplex systems is readily produced even then when a flip-flop—after recognizing the first synchronization word in the receiver side of the second time multiplex system—produces receiver pulses of the two time multiplex systems in the diplexer of the receiver side. This flip-flop is also controlled such that it exchanges the phases of the receiver pulses.

The monitoring of the assignment of the frames relative to the receiver sides of the time multiplex systems can readily result since the diplexer of the receiver side contains a switching stage which recognizes the first synchronization word. By means of a flip-flop receiver pulses are produced for the two time multiplex systems in the receiver side diplexer. This flip-flop is controlled such that the phases of the receiver pulses are exchanged. This circuit arrangement is also suited for a transmission of data output by a synchronous subscriber in place of the second time multiplex system.

BRIEF DESCRIPTION OF THE DRAWINGS

FIG. 6 illustrates a block diagram of another diplexer useful at the receiver side.

DESCRIPTION OF THE PREFERRED EMBODIMENTS

Figure 1:
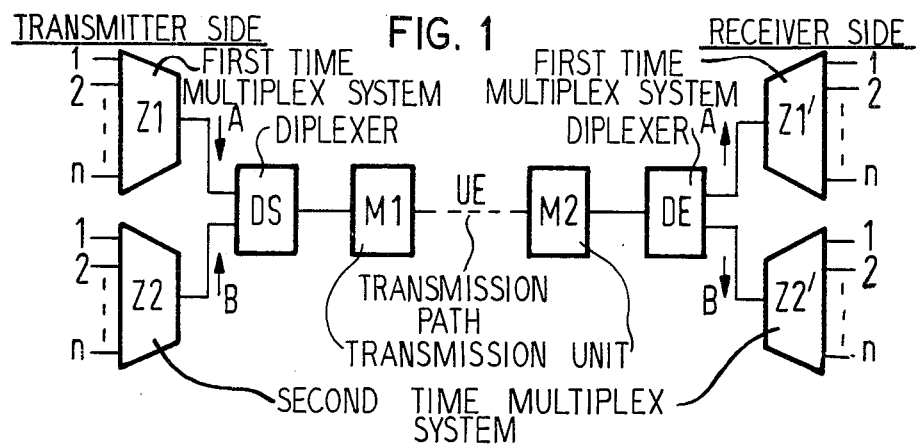
FIG. 1 shows a block circuit diagram for a transmission arrangement.

In the data transmission arrangement illustrated in FIG. 1, data is transmitted between two multiplex systems $Z1$, $Z1'$ and $Z2$, $Z2'$ via a joint or common transmission path UE. The time multiplex systems $Z1$, $Z1'$ and $Z2$, $Z2'$ are designed in a known manner and as described, for example, in a publication "Time Multiplex System ZD1000-Cl for Teletype and Data Transmission", Siemens-Publication 52 (1978), Vol. 3, Pages 128 through 131) incorporated herein by reference. The transmitter sides $Z1$ or $Z2$ of the time multiplex systems carry out a bit-wise nesting or interlacing of the data of the respective data channels 1 through n and output data in the form of frames formed from a multiplicity of binary characters. These frames respectively contain a synchronization word in addition to the data. The receiver sides $Z1'$ and $Z2'$ again assign the data contained in the frames to the individual data channels 1 through n utilizing the synchronization word.

In case a transmission path UE is available for the transmission of the data and permitting a multiple transmission rate of a time multiplex system, bit flows consisting of binary characters A or B of the two time multiplex systems $Z1$, $Z1'$ and $Z2$, $Z2'$ are combined utilizing a diplexing device. The diplexing device contains a diplexer DS at the transmitter side which chronologically interlaces the binary characters A and B output by the two transmitter sides $Z1$ and $Z2$ of the time multiplex systems and outputs said binary characters via a transmission unit M1 at the transmitter side to the transmission path UE. The diplex device also contains a diplexer DE at the receiver side which is connected to transmission path UE via a transmission unit M2 at the receiver side. The diplexer DE of the receiver side assigns the binary characters A and B to the receiver sides $Z1'$ and $Z2'$ of the time multiplex systems again so that the data can be output to the respective data channels 1 through n of the two time multiplex systems utilizing the synchronization words.

The binary characters A or B respectively represent the data characters contained in a frame and also represent the synchronization words. During the transmission of data, the time multiplex system $Z1$, $Z1'$ operates with the aid of a first synchronization word corresponding e.g. with the synchronization word with the binary character 100010 utilized in the time multiplex systems according to CCITT recommendation R. 101, Version B. The time multiplex system $Z2$, $Z2'$ operates with a second synchronization word which is different from the first synchronization word and differs, for example, only by an altered binary character and contains binary characters 110010. Transmitter sides $Z1$ and $Z2$ continuously transmit the first or the second synchronization word, whereas the receiver sides $Z1'$ and $Z2'$ are adjusted to the first synchronization word at the beginning of the transmission of data. If the first synchronization word is recognized in one of the receiver sides $Z1'$ or $Z2'$, the receiver side $Z2'$ is adjusted to the second synchronization word and the correct assignment of bit flows A and B relative to the time multiplex systems is produced.

Modems (modulator-demodulator), for example, are provided as transmission units M1 and M2. In the following it is assumed that the bit flows of each time multiplex system are output with a transmission rate of 2400 bits/sec. and the transmission path is designed for a transmission rate of 4800 bits/sec.

Figure 2:
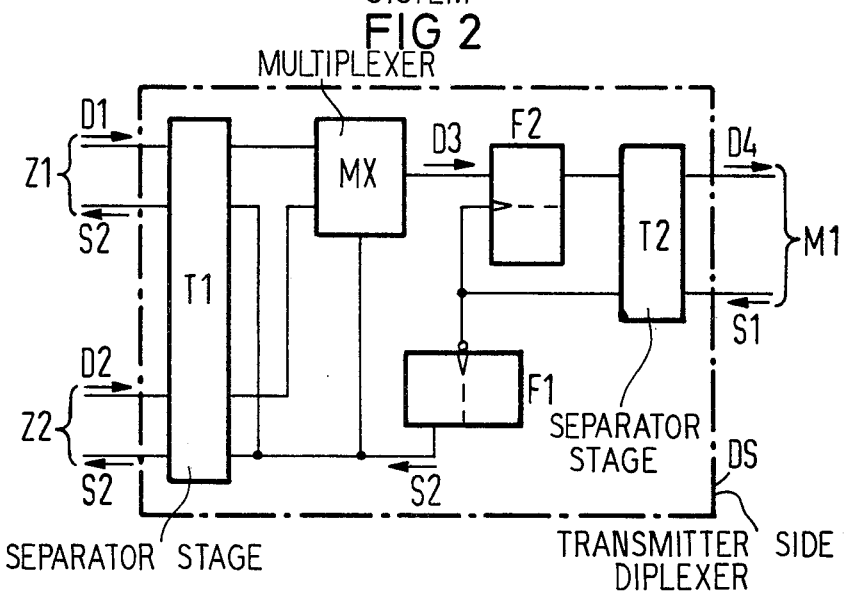
FIG. 2 illustrates a block diagram circuit of a diplexer of the transmitter side.

Diplexer DS of the transmitter side and illustrated in FIG. 2 contains a multiplexer MX and two flip-flops F1 and F2. It also contains two separator stages T1 and T2 well known in the art containing, if necessary, level converters well known in the art in order to adjust the input-output interfaces. Additional details of FIG. 2 are described in conjunction with the time diagrams illustrated in FIG. 3.

Figure 3:
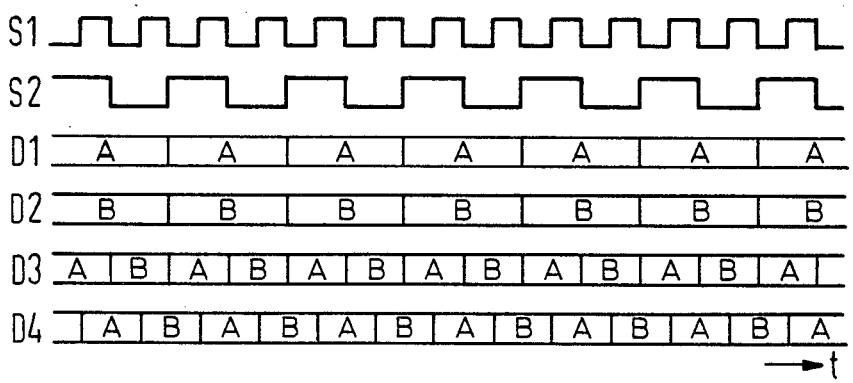
FIG. 3 shows time diagrams of signals at various points of the diplexer of the transmitter side.

In the time diagrams illustrated in FIG. 3, the time t is plotted in the abscissa direction and signals at various points of the diplexer DS of the transmitter side are plotted in the ordinate direction.

Transmission unit M1 outputs transmitter pulses S1 to flip-flops F1 and F2 via separator stage T2 with a sequence frequency of 4.8 kHz. Flip-flops F1 alters its stage with each falling or descending flank of the transmitter pulses S1. This flip-flop is used as a frequency divider and its outputs divided transmitter pulses S2 with a sequence frequency of 2.4 kHz to the transmitter sides $Z1$ and $Z2$ of the time multiplex systems via separator stage T1, on the one hand, and to the selection input of multiplexer MX, on the other hand. In dependence upon transmitter pulses S2, the transmitter sides $Z1$ and $Z2$ output data signals D1 or D2, respectively, which represent the binary characters A or B, respectively, of the respective frames assigned to the data and to the synchronization words. Multiplexer MX—in dependence upon the binary values of the transmitter pulses S2—alternately switches through the binary characters A and B as signals S3 to the data input of flip-flop F2. Flip-flop F2, controlled by the transmitter pulses S1, outputs the data signals D4 to transmission unit M1 via separator stage T2. Data signals D4 correspond with the chronologically displaced signals D3 and represent the chronologically interlaced binary characters A and B of the frames output by the transmitter sides $Z1$ and $Z2$ of the time multiplex systems.

Diplexer DE1 of the receiver side and illustrated in FIG. 4 again divides the bit currents received by the transmission unit M2 to the two multiplex systems. This diplexer contains five flip-flops F3 through F7, an AND-element U1, a NAND-element N1, and also two separator stages T3 and T4 in order to adjust the level of the signals transmitted via input-output interfaces. Receiver pulses E1 with a sequence frequency of 4.8 kHz and data signals D5 corresponding with data signals D4 are conveyed to diplexer DE1 of the receiver side by a transmission unit M2. Diplexer DE1 outputs data D6 received and the respective receiver pulses E2, or data D7 received and the respective receiver pulses E3 are output to the receiver sides Z1' and Z2'. Receiver sides Z1' and Z2' output signals S3 or S4, respectively, to diplexer DE1 when the respective synchronization words have been recognized. Diplexer DE1 also outputs a signal S7 to the receiver side Z2'. With signal S7 the receiver side can be adjusted to the second synchronization word.

Figure 5:
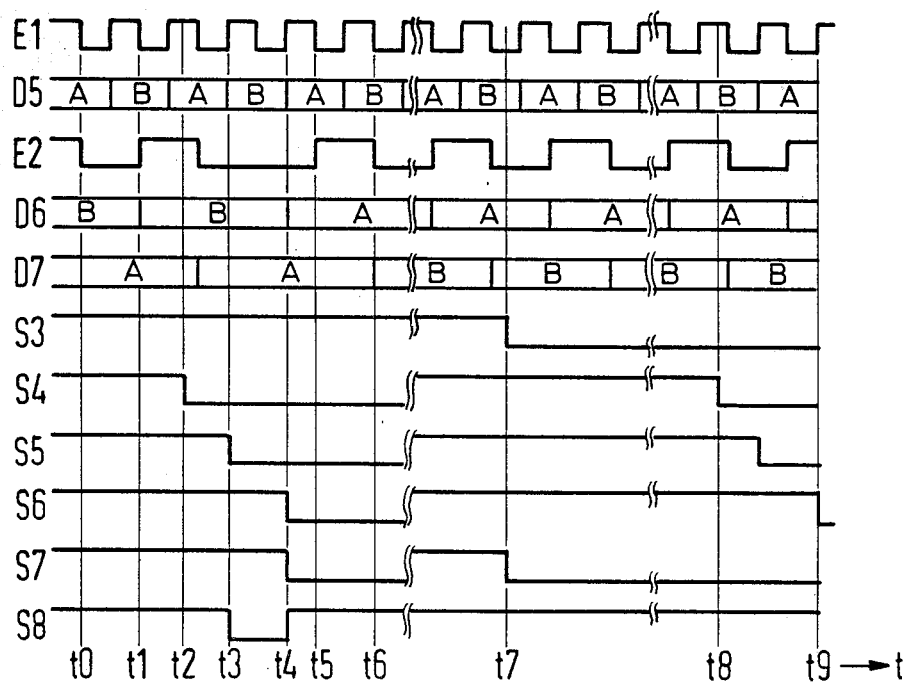
FIG. 5 shows time diagrams of signals at various points of the first diplexer of the receiver side.

Additional details of diplexer DE1 are described hereafter in conjunction with the time diagrams illustrated in FIG. 5.

In the time diagrams illustrated in FIG. 5, time t is illustrated along the abscissa and the instantaneous values of the signals as they accumulate during the operation of diplexer DE1 are illustrated along the ordinate.

The receiver pulses E1 with the repetition rate of 4.8 kHz output by the transmission unit M2, and in conjunction with data signals D5, are conveyed to the JK flip-flop F3 via separator stage T3. If the signals at inputs J and K have the binary value 1, flip-flop F3 is flipped with each falling flank of the receiver pulses E1. Receiver pulses E2 and E3 output at its output then have a repetition rate of 2.4 kHz.

At the point in time t0 the receiver pulse E2 alters its binary value from 1 to 0 with the falling flank of receiver pulse E1. Simultaneously, the receiver pulse E3 alters its binary value from 0 to 1. Furthermore, the binary characters A and B illustrated by data signals D5 occur in the sequence illustrated. At point in time t0, the binary value of binary character A is therefore stored in flip-flop F4 with the aid of receiver pulse E3. Correspondingly, at time t1 the binary value of binary character B is stored in flip-flop F5 with the aid of signal E2. The output signals of flip-flops F4 and F5 are output to the receiver sides Z2' and Z1' as data signals D7 or D6, respectively.

Due to a still missing synchronization of transmitter sides Z1' and Z2' and of diplexer DE1, the assignment of binary characters A and B is still defective. At the point in time t2 it is assumed that the receiver side Z2' recognizes the first synchronization word and outputs signal S4 which assumes the binary value of 0. This binary value is stored in flip-flop F6 with the next-following ascending flank of receiver pulse E1, and signal S5 assumes the binary value of 0 at time t3. With the assumption that signals S6 and S7 have the binary value of 1, the NAND element N1 outputs a signal S8 with the binary value of 0, which prevents a flipping of flip-flop F3 with the next-following trailing edge of receiver pulse E1. The binary value of 0 is stored in flip-flop F6 with the next-following ascending edge of receiver pulse E1, and signal S6 assumes the binary value of 0. Thereby, signal S7 also assumes the binary value of 0. Moreover, signal S8 again assumes the binary value of 1 and again facilitates the flipping of flip-flop F3.

A phase jump of 180° results in the receiver pulses E2 and E3 by means of signal S8, said jump corresponding with an exchange of the phases of receiver pulses E2 and E3. The binary values of binary characters A and B at times t5 and t6 are stored in flip-flop F5 or F4, respectively, with the aid of the subsequent receiver pulses E2 and E3. Thus, the assignment of binary characters A and B relative to the time multiplex systems is corrected. Signal S7, which assumed the binary value of 0 at time t4, adjusts the receiver side Z2' to the second synchronization word. After recognizing the second synchronization word, the transmission results between data channels 1 through n of the time multiplex systems.

If during synchronization the receiver side Z1' recognizes the first synchronization word first, the assignment of binary characters A and B relative to receiver sides Z1' and Z2' are already correct and diplexer DE1 outputs signal S7 to receiver side Z2' at time t7. This signal S7 adjusts this side to the second synchronization word.

If receiver side Z2' recognizes the second synchronization word it outputs—as when recognizing the first synchronization word at time t2—a signal S4 at time t8. This signal S4 assumes the binary value of 0. Similarly, as was the case between times t2 and t4, signals S5 and S6 are produced between times t8 and t9. The binary values of signals S7 and S8 remain unaltered as signal S3 with the binary value of 0 causes signal S7 with the binary value of 0 at the output of the AND-element U1. This signal S7 causes signal S8 with the binary value of 1 at the output of NAND-element N1.

Figure 4:
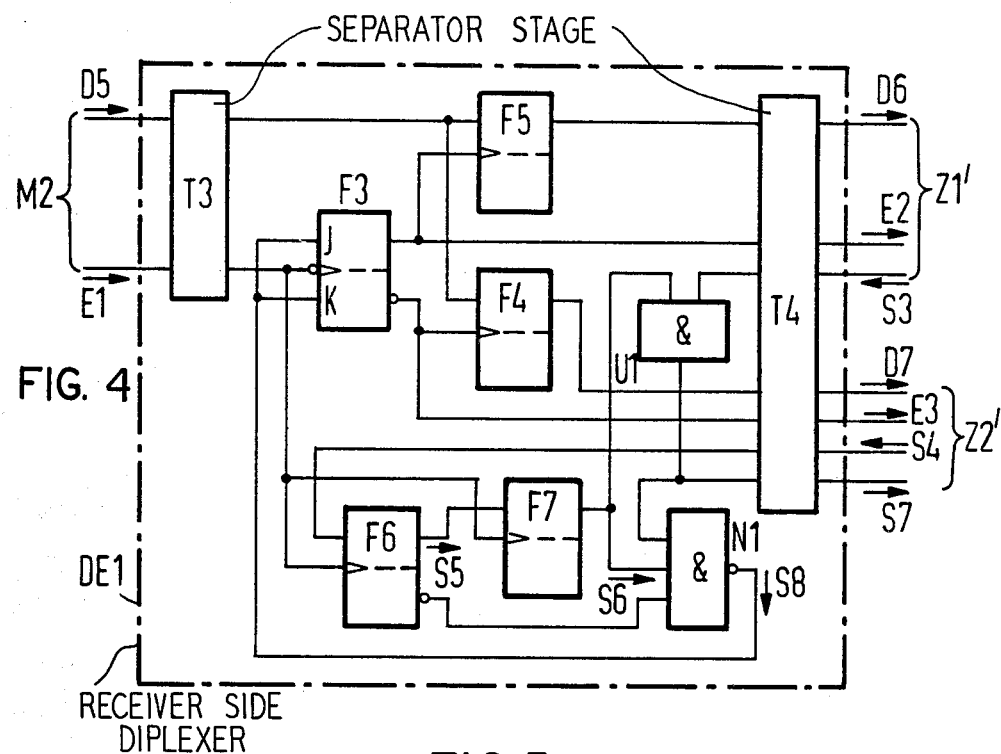
FIG. 4 illustrates a block diagram of a diplexer of the receiver side.

The embodiment of an additional diplexer DE2 at the receiver side illustrated in FIG. 6 differs from diplexer DE1 illustrated in FIG. 4 essentially only in that a switching stage SS is provided which consists of a shift register and a comparator and which recognizes the first synchronization word in the same fashion as a circuit arrangement provided in the receiver side Z1'. If this switching stage SS recognizes the first synchronization word in a bit flow which is assigned to the second time multiplex system, it is assumed that a wrong assignment is present and a phase alteration of receiver pulses E2 and E4 is carried out similarly as between points in time t2 and t3. This embodiment is also suited for the transmission of data of a time multiplex system and a subscriber ST for a synchronous data transmission in addition to the use with two time multiplex systems. This subscriber has no switching stage which recognizes synchronous words. Switching stage SS is therefore provided in diplexer DE2 which examines the bit flow conveyed to subscriber ST for the appearance of the first synchronization word and, if necessary, alters the assignment.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A circuit arrangement for transmitting data between two time multiplex systems via a common transmission path, comprising: first and second transmitter side time multiplex systems producing binary characters, and first and second receiver side time multiplex systems; a transmitter side diplexer means connected to outputs of the transmitter side first and second time multiplex systems for alternately switching through to the transmission path via a transmission unit frames of binary characters of the first and of the second time multiplex systems, frames of the first system having a first synchronization word and frames of the second system having a second synchronization word; a receiver side transmission unit connected to the transmission path; a receiver side diplexer means connected at an output of the receiver side transmission unit for alternately assigning the binary character frames to the receiver side first and second time multiplex systems, said receiver side diplexer means after recognition of the first synchronization word in one of the receiver side time multiplex systems producing a correct assignment of the binary character frames relative to the first and second receiver side time multiplex system; and said receiver side diplexer means including means for exchanging the binary character frames being received by the first and second receiver side time multiplex systems when the receiver side second time multiplex system recognizes the first synchronization word.

2. A circuit arrangement for transmitting data between two time multiplex systems via a common transmission path, comprising: first and second transmitter side time multiplex systems producing binary characters, and first and second receiver side time multiplex systems; a transmitter side diplexer means connected to outputs of the transmitter side first and second time multiplex systems for alternately switching through to the transmission path via a transmission unit frames of binary characters of the first and of the second time multiplex systems, frames of the first system having a first synchronization word and frames of the second system having a second synchronization word; a receiver side transmission unit connected to the transmission path; a receiver side diplexer means connected at an output of the receiver side transmission unit for alternately assigning the binary character frames to the receiver side first and second time multiplex systems, said receiver side diplexer means after recognition of the first synchronization word in one of the receiver side time multiplex systems producing a correct assignment of the binary character frames relative to the first and second receiver side time multiplex systems; the transmitter side diplexer means comprising a frequency divider means for receiving transmission pulses from the transmission unit and producing divided transmission pulses which are fed to the first and second transmitter side time mutiplex systems; a multiplexer means for receiving the divided transmission pulses and for combining data signals from the first and second transmitter side time multiplex systems and outputting an interlaced data frame data signal for transmission; and the transmission pulses connecting through a first flip-flop to a selection input of the multiplexer means and a second flip-flop being provided between the multiplexer means and the transmission unit.

3. A circuit arrangement for transmitting data between two time multiplex systems via a common transmission path, comprising: first and second transmitter side time multiplex systems producing binary characters, and first and second receiver side time multiplex systems; a transmitter side diplexer means connected to outputs of the transmitter side first and second time multiplex systems for alternately switching through to the transmission path via a transmission unit frames of binary characters of the first and of the second time multiplex systems, frames of the first system having a first synchronization word and frames of the second system having a second synchronization word; a receiver side transmission unit connected to the transmission path; a receiver side diplexer means connected at an output of the receiver side transmission unit for alternately assigning the binary character frames to the receiver side first and second time multiplex systems, said receiver side diplexer means after recognition of the first synchronization word in one of the receiver side time multiplex systems producing a correct assignment of the binary character frames relative to the first and second receiver side time multiplex systems;

said receiver side diplexer means comprising a divider means for receiving receiver pulses from the receiver side transmission unit and providing divided receiver pulses to the first and second receiver side time multiplex systems; means for receiving first and second synchronization word recognition signals from the respective first and second receiver side time multiplex systems; and means for exchanging a phase of the first and second divider receiver pulses when the receiver side second time multiplex system recognizes the first synchronization word.

4. A circuit arrangement according to claim 3 wherein the diplexer means comprises a first flip-flop for creating the first and second divided receiver pulses from the receiver pulse received from the receiver side transmission unit; a second flip-flop controlled by one of the outputs of the first flip-flop and for feeding through data signals from the transmission unit to the second receiver side time multiplex system; a third flip-flop controlled by the other output of the first flip-flop and for feeding through the data signals to the first time multiplex system; a fourth flip-flop controlled by the receiver pulses and for feeding through the second of the synchronization word recognition signals; a fifth flip-flop also controlled by the receiver pulses and for feeding through the output of the fourth flip-flop to a NAND gate, the NAND gate also receiving an output from the fourth flip-flop and also receiving an output from an AND gate, output of the NAND gate connecting to inputs of the first flip-flop; the AND gate having one of its inputs connected to receive the first synchronization word signal and its other input being connected to the output of the fifth flip-flop; and the output of the AND gate providing a signal for adjusting the second receiver side time multiplex system to the second synchronization word.

* * * * *